United States Patent [19]
Takamiya et al.

[11] Patent Number: 5,253,890
[45] Date of Patent: Oct. 19, 1993

[54] BICYCLE FRAME

[75] Inventors: Kikuzo Takamiya, Kitamoto; Hiroshi Todoroki, Ageo; Masazumi Shimizu, Okegawa, all of Japan

[73] Assignee: Bridgestone Cycle Co., Ltd., Japan

[21] Appl. No.: 808,763

[22] Filed: Dec. 17, 1991

[30] Foreign Application Priority Data

| Dec. 18, 1990 [JP] | Japan | 2-411281 |
| Dec. 18, 1990 [JP] | Japan | 2-411282 |
| Mar. 18, 1991 [JP] | Japan | 3-077172 |
| Jul. 4, 1991 [JP] | Japan | 3-189584 |

[51] Int. Cl.⁵ ............................................ B62K 19/02
[52] U.S. Cl. ............................................ 280/281.1
[58] Field of Search ............................ 280/281.1

[56] References Cited

U.S. PATENT DOCUMENTS

| 1,553,824 | 9/1925 | Langenberg. | |
| 2,353,712 | 7/1944 | Dewey | 280/281.1 |
| 3,350,905 | 11/1967 | Ogura et al. | 72/28 |
| 3,889,975 | 6/1975 | Falgoni | 280/281.1 |
| 4,293,141 | 10/1981 | Brilando | 280/281.1 |
| 4,437,679 | 3/1984 | Campagnolo | 280/281.1 |
| 4,484,756 | 11/1984 | Takamiya et al. | 280/281.1 |
| 4,541,648 | 9/1985 | Takamiya et al. | 280/281.1 |
| 4,840,053 | 6/1989 | Nakamura | 72/58 |
| 4,902,160 | 2/1990 | Jeng | 280/281.1 |

Primary Examiner—Mitchell J. Hill
Attorney, Agent, or Firm—Parkhurst, Wendel & Rossi

[57] ABSTRACT

A bicycle frame includes a top tube provided with bulge-processed regions at its front and rear end portions, formed with bores having axes which intersect a longitudinal axis of the top tube, for accommodating therein the upper end portions of the head tube and the seat tube, respectively. The frame further includes a down tube provided with a bulge-processed region at its front end portion, formed with a bore having an axis which intersects a longitudinal axis of the down tube, for accommodating therein the lower end portion of the head tube, and optionally provided with another bulge-processed region at its rear end portion, formed with a bore having an axis which intersects the longitudinal axis of the down tube, for accommodating therein the lower end portion of the seat tube. The frame has an optimized distribution of effective section modulus in the longitudinal direction of the top and down tubes, to realize a markedly improved rigidity and mechanical strength.

10 Claims, 13 Drawing Sheets

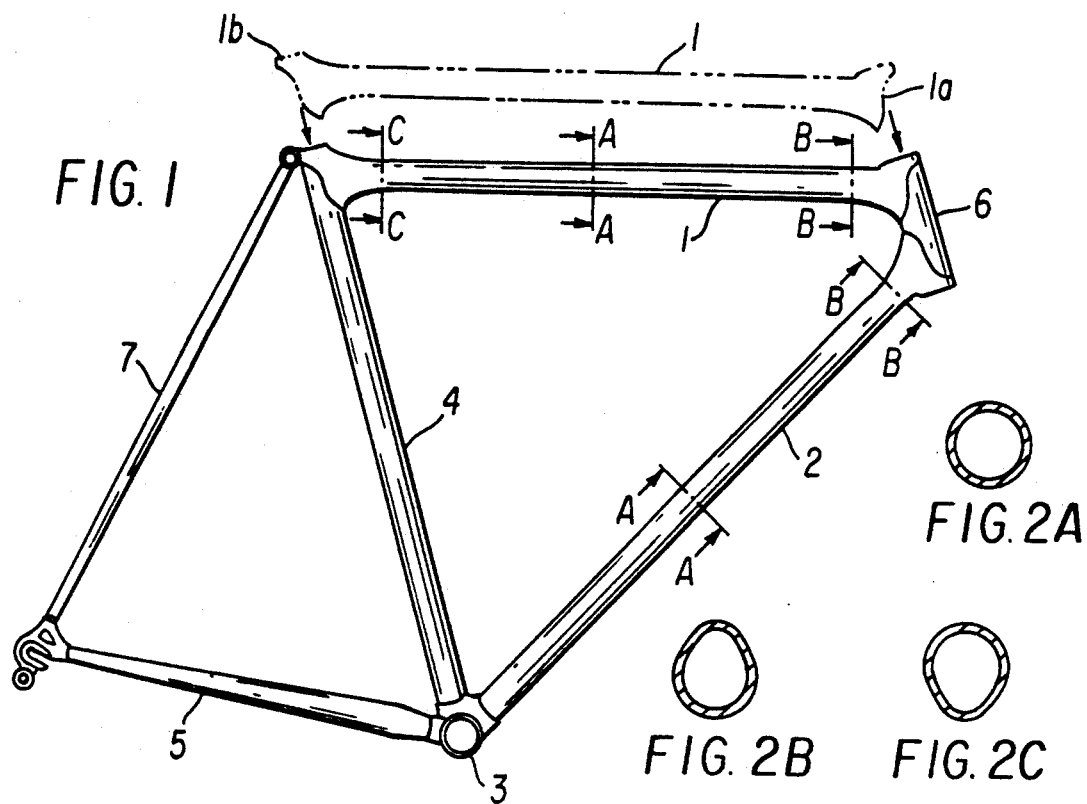
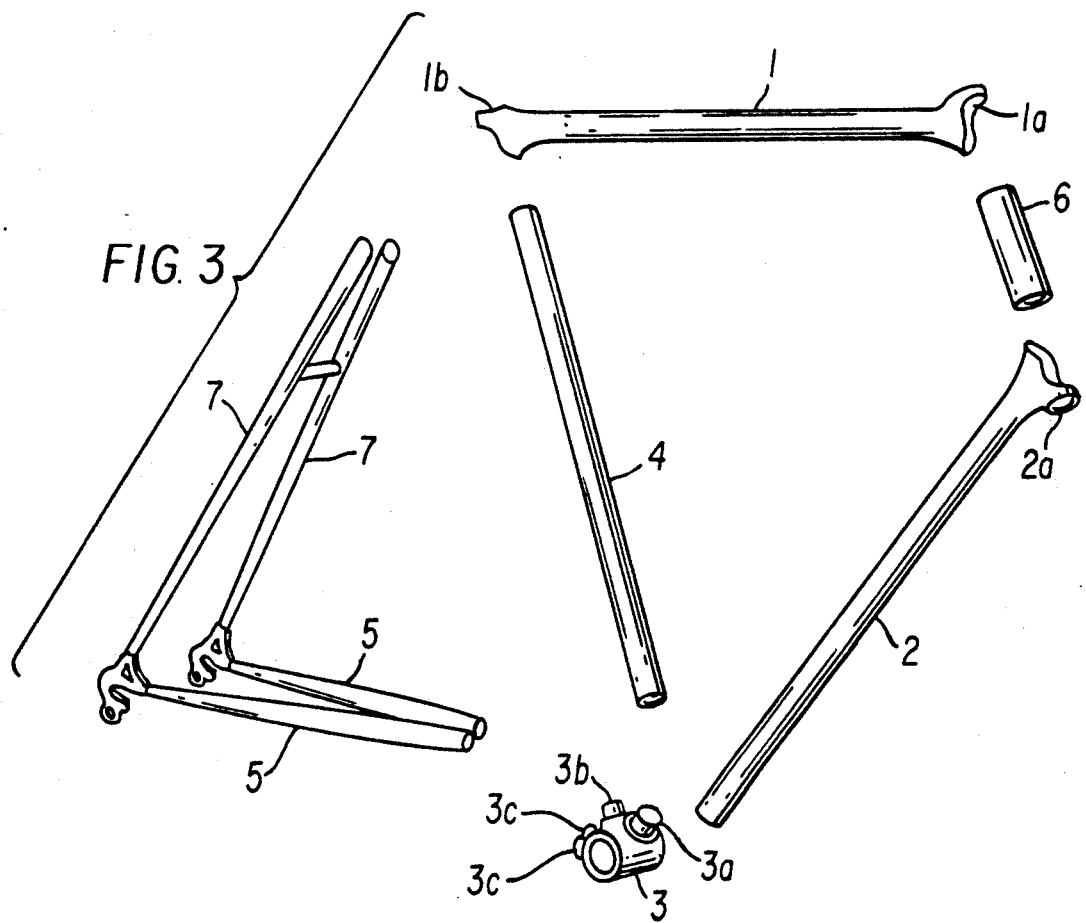

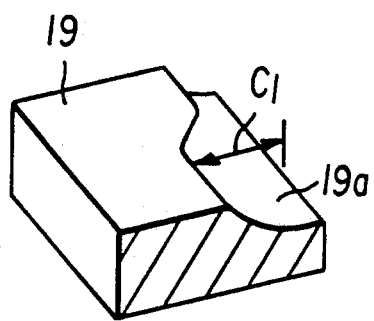 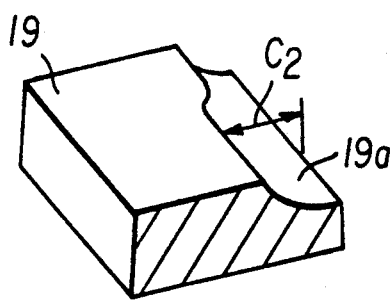
FIG. 19A  FIG. 19B
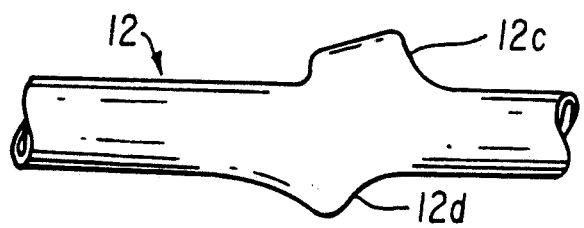
FIG. 20A
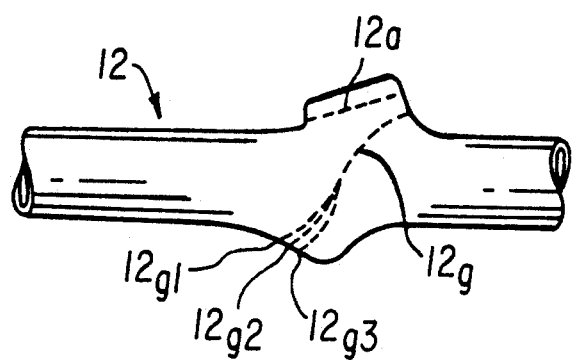
FIG. 20B

BICYCLE FRAME

BACKGROUND OF THE INVENTION

1. Field of the Invention

The present invention relates to a bicycle frame; more specifically, it pertains to a so-called diamond-type bicycle frame having a unique distribution of effective section modulus in the longitudinal direction of tube members, for realizing optimized rigidity and mechanical strength. The invention further relates to a method of, and an apparatus for manufacturing such bicycle frames.

2. Description of the Related Art

Typically, a diamond-type bicycle frame is composed of various tube members, including a head tube, a top tube, a down tube, a seat tube, a pair of seat stays and a pair of chain stays. The upper and lower ends of the head tube are integrally connected to the front end portions of the top tube and the down tube, respectively. A hanger lug is integrally connected to the rear end of the down tube, the lower end of the seat tube and the front ends of the respective chain stays. Each seat stay has a front end which is integrally connected to the rear end of the top tube or to the upper end of the seat tube, and also has a rear end which is integrally connected to the rear end of the relevant chain stay.

As widely known in the art, bicycle frames are generally classified into a lugged frame and a lugless frame. Thus, a diamond-type lugged frame incorporates head lugs between the head tube and the top tube and also between the head tube and the down tube, a seat lug between the top tube and the seat tube, and a hanger lug between the down tube and the seat tube. On the other hand, in the case of a diamond-type lugless frame, the head tube and the top tube, the head tube and the down tube, and the top tube and the seat tube are respectively butt-welded to each other, without interposing lugs between the relevant tubes. Known bicycle frames of such basic structures do not afford sufficient rigidity or mechanical strength required for severe use conditions (e.g., off-road driving as in a mountain bicycle), and it is difficult to improve the manufacturing productivity of such known frames. Furthermore, regardless of whether the bicycle frame is of a lugged-type or a lugless-type, there may arise a dangerous situation wherein adjacent tube members undergo separation from each other due at least partly to brazing or welding failures.

More particularly, a diamond-type lugged frame is often manufactured by using a head tube which is integrally provided with head lugs, wherein the diameter of each fitting bore of the seat lug and the hanger lug is so determined that a predetermined clearance is left between the lug and the tube member. Due to the presence of such a clearance, each tube member can be axially inserted into the fitting bore of the relevant lug by a gradually incremental amount, until a predetermined insertion depth is reached. By assembling a set of head tube, top tube, down tube and seat tube, there is formed a so-called front triangle. After formation and shaping of the front triangle, subsequent steps are carried out wherein seat stays and chain stays are secured to jigs as rear triangles and integrally connected to the front triangle by brazing, and the distortion of the entire frame is finally corrected.

During the formation of a lugged frame as above, each tube member assumes a fixed angular relationship with the relevant lug, particularly when the tube member has been deeply inserted into the lug. In a condition wherein the top tube and the down tube are rigidly retained by the seat lug and the hanger lug at both ends of the seat tube, respectively, since the head tube is integrally provided with head lugs, it is almost impossible to assemble the head tube in the final stage of the front triangle formation. It has therefore been a conventional practice to insert the front end portion of the top tube and the down tube into the respective head lugs and to simultaneously insert the rear end portion of the seat lug. Of course, the necessity for such simultaneous insertion of a plurality of tube members prohibits the realization of an automated assembly of the bicycle frames.

Apart from the above, it is widely known in the art that each tube member of a bicycle frame is subjected to various loads during use, of which a bending moment is a predominant load. Moreover, the bending stress occurring in the tube member assumes the maximum value at the axial end portions of the tube member and is relatively low in the intermediate portion thereof. Thus, in ordinary bicycle frames including a tube member with an effective section modulus which is substantially constant in its longitudinal direction, the tube member is designed to have a section modulus which is determined with reference to the maximum stress at the end portion. As a result, the intermediate portion of the tube member has an excessive strength which is in fact unnecessary, and which is one important factor prohibiting the realization of bicycle frames with minimized weight.

SUMMARY OF THE INVENTION

It is therefore an object of the present invention to provide an improved bicycle frame which can be readily manufactured by an automated process.

Another object of the invention is to provide an improved bicycle frame having sufficient rigidity and mechanical strength, a high accuracy, and a minimized weight.

Still another object of the invention is to provide novel method of, and apparatus for manufacturing bicycle frames, which is capable of significantly improving the productivity and which is suitable for manufacturing bicycle frames of various specifications (e.g., frame size) with a high accuracy and at a reduced cost.

According to one aspect of the present invention, there is provided a bicycle frame comprising: a head tube having upper and lower end portions; a top tube having front and rear end portions; a down tube having front and rear end portions; a seat tube having upper and lower end portions; first and second seat stays each having front and rear end portions; first and second chain stays each having front and rear end portions; the upper end and the lower end of the head tube being integrally connected to the front end portions of the top tube and the down tube, respectively; a hanger lug integrally connected to the rear end portion of the down tube, the lower end portion of the seat tube and the front end portions of the respective chain stays; the front end portions of the respective seat stays being integrally connected to the rear end portion of the top tube; the first seat stay and the first chain stay forming a pair with the respective rear end portions integrally connected to each other; the second seat stay and the second chain stay forming another pair with the respective rear end portions integrally connected to each other; wherein the top tube has a bulge-processed region at the front end portion thereof, formed with a bore having an axis which intersects a longitudinal axis of the top tube, and accommodating therein the upper end portion of the head tube; wherein the down tube has a bulge-processed region at the front end portion thereof, formed with a bore having an axis which intersects a longitudinal axis of the down tube, and accommodating therein the lower end portion of the head tube; and wherein the top tube has another bulge-processed region at the rear end portion thereof, formed with a bore having an axis which intersects the longitudinal axis of the top tube, and accommodating therein the upper end portion of the seat tube.

According to another aspect of the present invention, there is provided a method of manufacturing a bicycle frame including a first tube with two end portions and an intermediate portion between the end portions, at least one end portion of the first tube having a bulge-processed region formed with a bore having an axis which intersects a longitudinal axis of the tube, and accommodating therein an end portion of a second tube, wherein the method comprises the steps of:

preparing a group of mutually exchangeable first dies for forming one end portion of the first tube, said first dies being different from each other corresponding to different specifications of said one end portion of the first tube;

preparing a group of mutually exchangeable second dies for forming another end portion of the first tube, said second dies being different from each other corresponding to different specifications of said another end portion of the first tube;

preparing a group of mutually exchangeable third dies for forming the intermediate portion of the first tube, said third dies being different from each other corresponding to different specifications of the intermediate portion of the first tube;

selecting each one of the first dies, the second dies and the third dies from the respective groups corresponding to a desired specifications of the first tube to be formed, and detachably connecting the selected first, second and third dies with each other to form a die assembly defining a cavity therein; and placing a blank tube within the cavity of the die assembly and subsequently subjecting the blank tube to a bulge process thereby to form the first tube.

According to still another aspect of the present invention, there is provided an apparatus for manufacturing a bicycle frame including a first tube with two end portions and an intermediate portion between the end portions, at least one end portion of the first tube having a bulge-processed region formed with a bore having an axis which intersects a longitudinal axis of the tube, and accommodating therein an end portion of a second tube, said apparatus comprising means for forming the first tube, wherein said means comprises:

a first die for forming one end portion of the first tube, selected from a group of mutually exchangeable dies which are different from each other corresponding to different specifications of said one end portion of the first tube;

a second die for forming another end portion of the first tube, selected from a group of mutually exchangeable dies which are different from each other corresponding to different specifications of said another end portion of the first tube; and a third die for forming the intermediate portion of the first tube, selected from a group of mutually exchangeable dies which are different from each other corresponding to different specifications of the intermediate portion of the first tube;

said first, second and third dies being detachably connected to each other to form a die assembly defining a cavity therein; in which a blank tube can be placed and subsequently subjected to a bulge process thereby to form the first tube.

BRIEF DESCRIPTION OF THE DRAWINGS

The present invention will be explained in further detail hereinafter, by referring to some preferred embodiments shown in the drawings in which:

FIG. 1 is a side view of a bicycle frame according to a first embodiment of the invention;

FIGS. 2A, 2B and 2C are cross-sectional views of the bicycle frame taken along the lines A—A, B—B and C—C in FIG. 1, respectively;

FIG. 3 is an exploded perspective view of the bicycle frame as shown in FIG. 1;

FIGS. 19A and 19B are plan views showing other examples of the stopper to be used in the die assembly of FIG. 17;

FIGS. 20A is a side view showing the bulge-process performed with respect to the front end portion of the top tube;

FIG. 20B is a side view showing the cutout formation process performed with respect to the front end portion of the top tube;

DETAILED EXPLANATION OF THE PREFERRED EMBODIMENTS

Figure 4A:
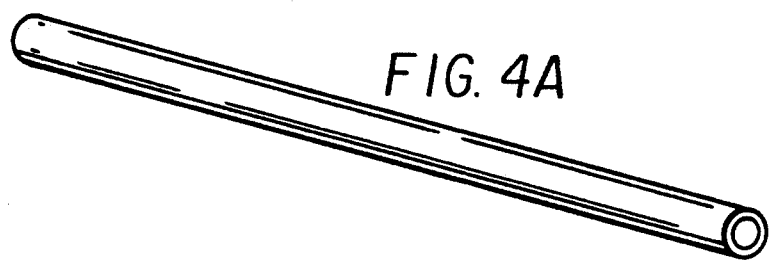
FIGS. 4A to 4D are perspective views showing the successive steps of the bulge-process for forming the top tube.

Referring now to FIGS. 1 to 3, there is shown a bicycle frame according to a first embodiment of the present invention. The bicycle frame of this embodiment includes a top tube 1 with bulge-processed front and rear end portions which are respectively formed with bores 1a, 1b having substantially parallel axes which intersect the longitudinal axis of the top tube 1. The bicycle frame further includes a down tube 2 with a bulge-processed front end portion formed with a bore 2a having an axis which intersect the longitudinal axis of the down tube 2.

As particularly shown in FIG. 3, a hanger lug 3 is composed of a tubular body which is integrally provided with a plurality of bulge-processed projections; i.e., a first projection 3a fitted within and integrally connected to the rear end portion of the down tube 2, a second projection 3b fitted within and integrally connected to the lower end portion of a seat tube 4, and a pair of third projections 3c fitted within and integrally connected to the front end portions of a pair of chain stays 5, respectively.

A head tube 6 has a lower end portion fitted within the bore 2a at the front end portion of the down tube 2 and integrally connected thereto, and an upper end portion fitted within the bore 1a at the front end portion of the top tube 1 and integrally connected thereto. The upper end portion of the seat tube 4 is fitted within the bore 1b at the rear end portion of the top tube 1 and welded thereto. A pair of seat stays 7 each has a front end portion which is integrally connected to the outer surface of the rear end portion of the top tube 1, and a rear end portion which is integrally connected to the rear end portion of the relevant chain stay 5. The above-mentioned tube members can be fixedly connected to adjacent tube members to form an integral assembly by appropriate means, including brazing, welding or adhesion.

Figure 4B:
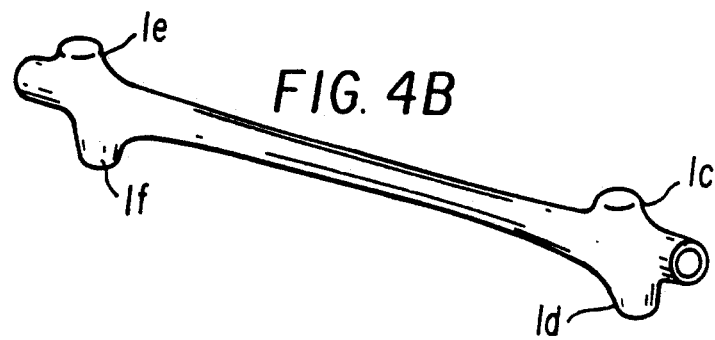
Figure 4C:
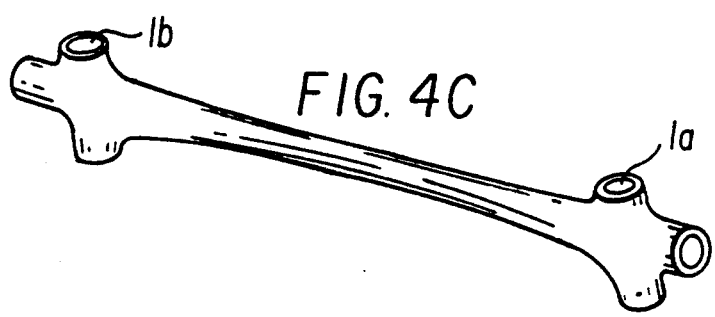
Figure 4D:
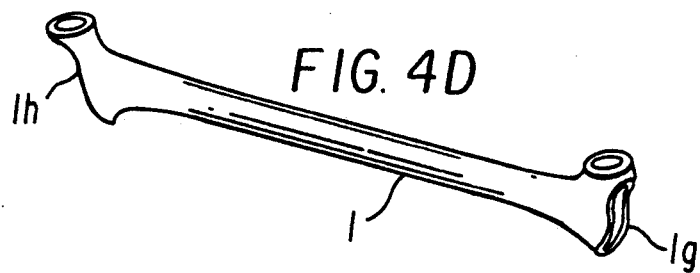
Figure 5:
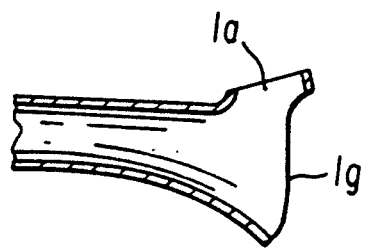
FIG. 5 is a fragmentary longitudinal view showing the configuration of the top tube at the front end portion is enlarged scale.

FIGS. 4A to 4D illustrate the successive steps of the bulge-process for forming the top tube 1. In this connection, it is to be understood that the down tube 2 can also be formed in substantially the same manner. The top tube 1 is prepared from a blank tube of a circular cross-section, as shown in FIG. 4A, which is placed in a cavity of a die assembly to be explained hereinafter. The inner space of the blank tube is subjected to a fluid pressure of a predetermined level. By this, as shown in FIG. 4B, the material of the blank tube undergoes a controlled plastic flow to form upper and lower projections 1c, 1d both protruding from the front end portion of the blank tube, and also upper and lower projections 1e, 1f both protruding from the rear end portion of the blank tube. Subsequently, as shown in FIG. 4C, the upper projections 1c, 1e at the front and rear end portions of the blank tube are formed with bores 1a, 1b, respectively. The front and rear end portions of the blank tube are thereafter formed with cutouts 1g, 1h as shown in FIG. 4D, in order to remove portions of the material which are unnecessary in the top tube 1. The front end portion of the top tube 1 so prepared has a longitudinal-section as shown in FIG. 5.

In this connection, U.S. Pat. Nos. 4,484,756 and 4,541,648 both assigned to the assignee of this application disclose detailed particulars of the bulge-process as applied to the formation of tube members for bicycle frames, so that the disclosure of these patents are herein incorporated by reference.

The bulge-process described above also serves to induce a plastic flow of the blank tube material such that the top tube 1 and the down tube 2 each has a cross-section which varies in the longitudinal direction. Thus, as shown in FIGS. 2A to 2C, the top tube 1 has a vertical dimension which gradually increases from the intermediate portion toward the front and rear end portions, and the down tube 2 has a vertical dimension which gradually increases from the intermediate portion toward the front end portion. More particularly, the top tube 1 has a circular cross-section at the intermediate portion (FIG. 2A), an oval, substantially egg-shaped cross-section at the front end portion (FIG. 2B), and an oval, substantially inverted egg-shaped cross-section at the rear end portion (FIG. 2C). Similarly, the down tube 2 has a circular cross-section at the intermediate portion, and an oval, substantially egg-shaped cross-section at the front end portion. Since the material of down tube 2 has not been subjected to a plastic flow at the rear end portion, the down tube 2 has a circular cross-section at the rear end portion.

The gradual change in the vertical dimension of the top tube 1 and the down tube 2 serves to effectively disperse the strain arising from various dynamic loads, in particular a bending moment, applied to the bicycle frame during a normal use condition of the bicycle. Moreover, the increased vertical dimension at the end portions of the top tube 1 and the down tube 2 results in their increased effective section-modulus which is an important factor to realize an optimized rigidity and mechanical strength as well as a minimized weight of the bicycle frame. It should be noted in this connection that a vertical asymmetry of the oval cross-section at the end portions of the top tube 1 and the down tube 2 corresponds to a vertically asymmetrical distribution of the axial stress which occurs in the end portions of the tubes 1, 2 as a result of combined bending moment and axial force both applied to the bicycle frame.

Formation of the bores 1a, 2a at the integrally bulge-processed front end portions of the top tube 1 and the down tube 2 ensures that, when the head tube 6 is inserted into the bores 1a, 2a and welded to the top tube 1 and the down tube 2, the mutually integrated tubes 1, 2, 6 function to positively support each other. Similarly, due to formation of the bore 1b at the integrally bulge-processed rear end portion of the top tube 1, when the seat tube 4 is inserted into the bore 1b and welded to the top tube 1, the mutually integrated tubes 1, 4 function to positively support each other. Thus, the tube members 1, 2, 4, 6 forming the front triangle of the bicycle frame are effectively prevented from separation even in a severe use condition, making it readily possible to realize a high-safety bicycle frame.

Formation of the bores 1a, 1b at the bulge-processed front and rear end portions of the top tube 1 is also advantageous in that it serves to significantly facilitate the assembly of the tube members for manufacturing a bicycle frame, since the top tube 1 can be readily engaged with the head tube 6 and the seat tube 4 at the bores 1a, 1b, respectively, after all other tube members have been successively positioned one by one and welded to each other, as shown by imaginary line in FIG. 1. Thus, the bicycle frame according to the invention can be suitably manufactured by an automated process with a higher productivity and at a reduced cost.

Moreover, formation of the cutout 1g in the front end region of the top tube 1, and of the cutout (2g in FIG. 10C) in the front end region of the down tube 2 makes it readily possible to effectively increase the surface areas with which the top tube 1 and the down tube 2 are fixedly secured to the head tube 6 by brazing, welding or adhesion.

Figure 6:
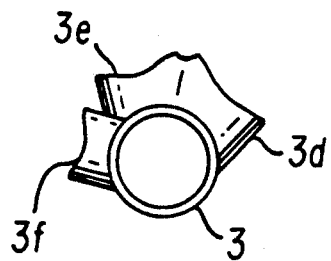
FIG. 6 is a side view showing a modified example of the hanger lug which may be used in the bicycle frame shown in FIG. 1.
Figure 7:
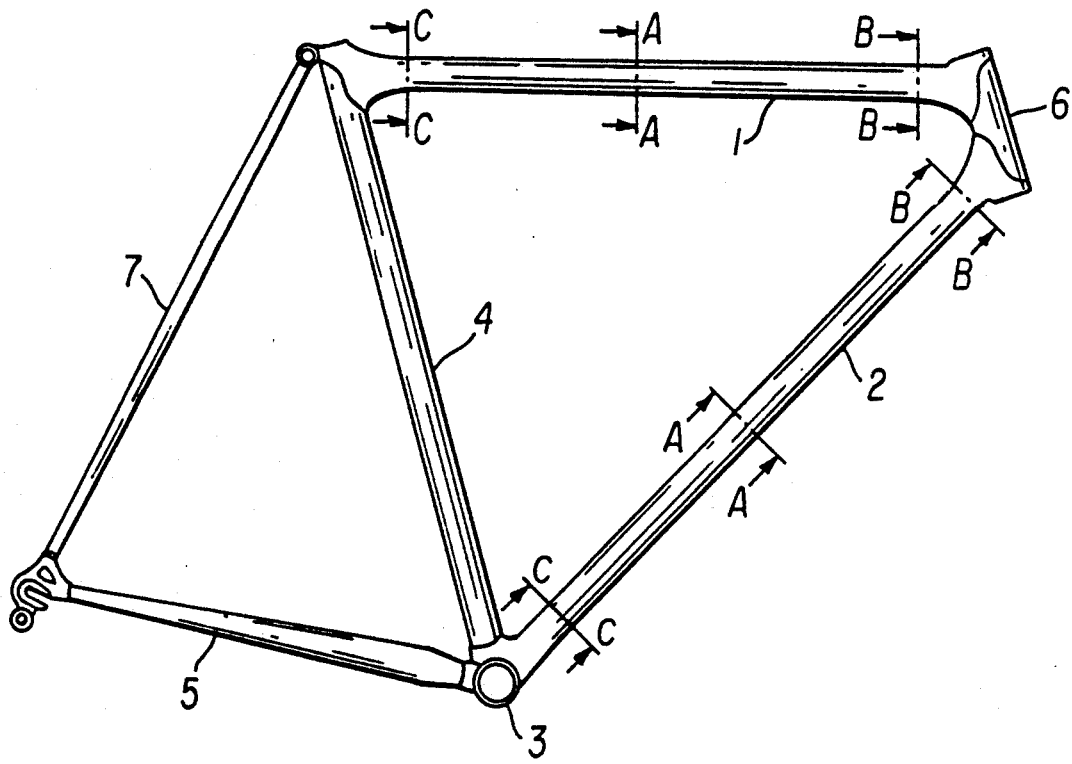
FIG. 7 is a side view of a bicycle frame according to a second embodiment of the invention.

FIG. 6 is a side view showing a modified example of the hanger lug 3 which may be used in the bicycle frame shown in FIG. 1. The hanger lug 3 shown in FIG. 6 is formed with a plurality of bulge-processed bosses; i.e. a first boss 3d in which the rear end portion of the down tube 2 is inserted and welded together, a second boss 3e in which the lower end portion of the seat tube 4 is inserted and welded together, and a pair of third bosses 3f in which the respective front end portions of the chain stays 5 is inserted and welded together.

Another embodiment of the bicycle frame according to the present invention will be explained below with reference to FIGS. 7 to 11, wherein identical reference numerals denote the same or functionally corresponding elements. This embodiment is substantially similar to the previous embodiment in its structure, and differs therefrom basically in that, as particularly shown in FIG. 8, the down tube 2 incorporates bulge-processed front and rear end portions which are respectively formed with bores 2a, 2b. These bores 2a, 2b have their axes which are substantially parallel to each other and which intersect the longitudinal axis of the down tube 2. Thus, the bore 2a at the front end portion serves to accommodate the lower end portion of the head tube 6, as in the previous embodiment, while the bore 2b at the rear end portion serves to accommodate the lower end portion of the seat tube 4. In this embodiment, each of top tube 1 and the down tube 2 has a circular cross-section at the intermediate portion (FIG. 2A), an oval, substantially egg-shaped cross-section at the front end portion (FIG. 2B), and an oval, substantially inverted egg-shaped cross-section at the rear end portion (FIG. 2C).

Figure 8:
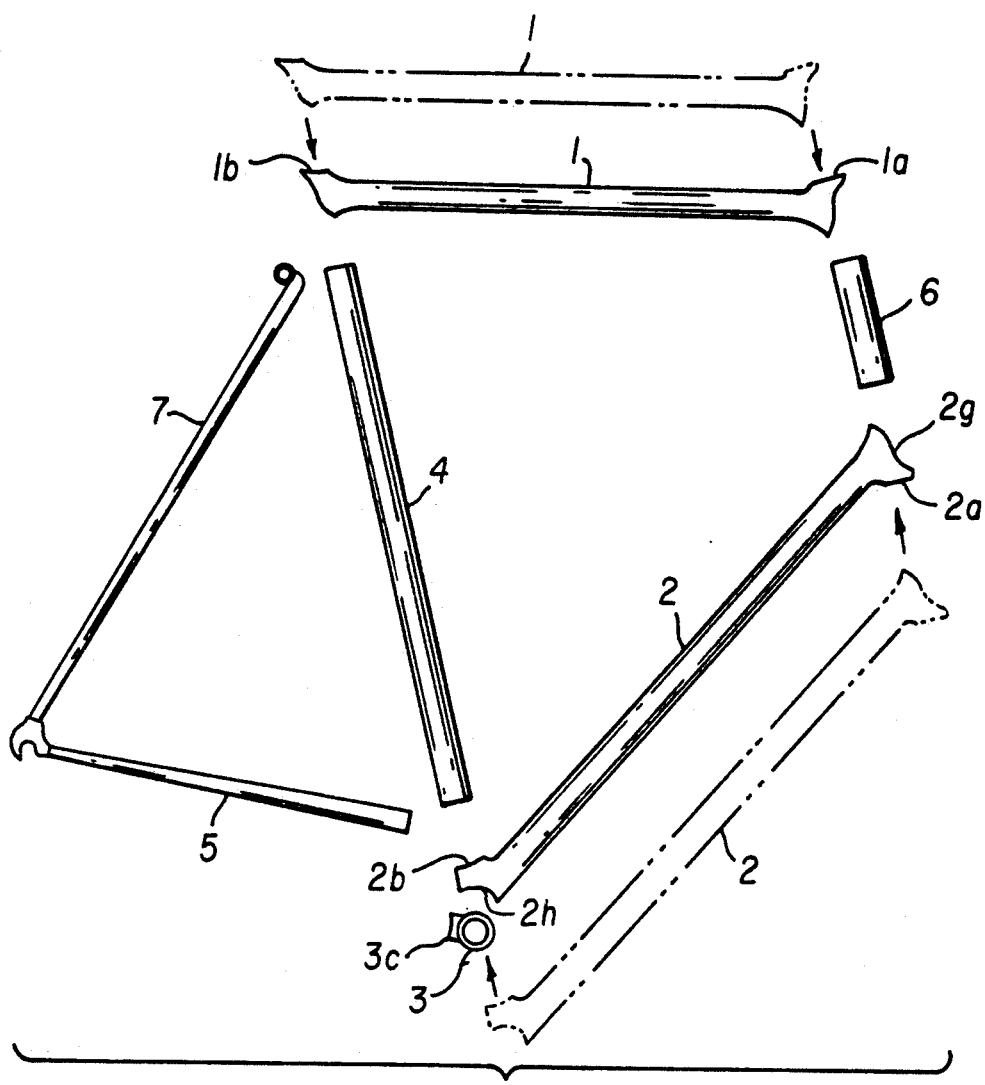
FIG. 8 is an exploded side view of the bicycle frame as shown in FIG. 7.
Figure 9:
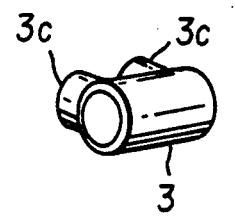
FIG. 9 is a perspective view of a hanger lug which may be used in the bicycle frame shown in FIG. 7.

Furthermore, as shown in FIGS. 8 and 9, the hanger lug 3 is composed of a tubular body which is integrally provided with a pair of bulge-processed bosses 3c engaged with and welded to the front end portions of a pair of chain stays 5, respectively. The hanger lug 3 is welded to the rear end portion of the down tube 2, and the lower end portion of the seat tube 4 is inserted into the bore 2b at the rear end portion of the down tube 2 and welded thereto.

Figure 10A:
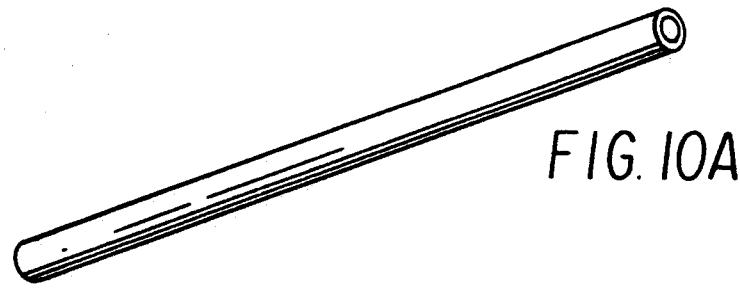
FIGS. 10A to 10C are perspective views showing the successive steps of the bulge-process for forming the down tube.
Figure 10B:
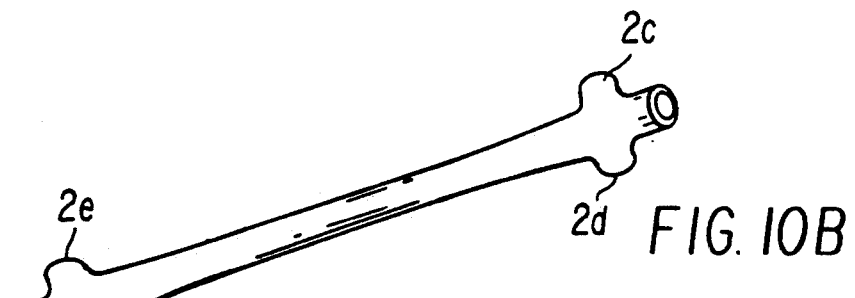
Figure 10C:
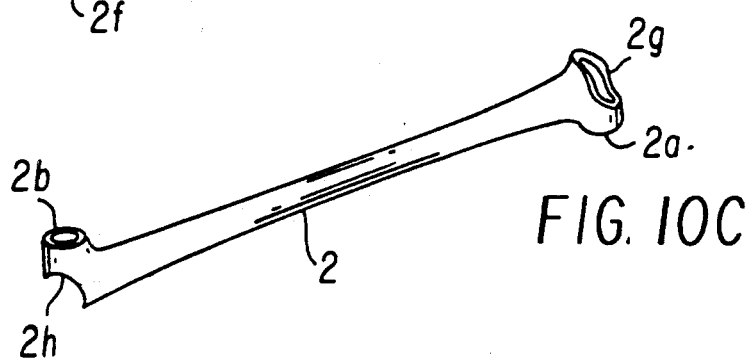
Figure 11:
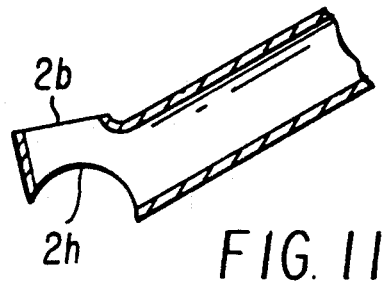
FIG. 11 is a fragmentary longitudinal view showing the configuration of the down tube at the rear end portion is enlarged scale.

FIGS. 10A to 10C illustrate the successive steps of the bulge-process for forming the down tube 2. The down tube 2 is prepared from a blank tube of a circular cross-section, as shown in FIG. 10A, which is placed in a cavity of a die assembly. The inner space of the blank tube is subjected to a fluid pressure of a predetermined level so that, as shown in FIG. 10B, the material of the blank tube undergoes a controlled plastic flow to form upper and lower projections 2c, 2d both protruding from the front end portion of the blank tube, and also upper and lower projections 2e, 2f both protruding from the rear end portion of the blank tube. Subsequently, as shown in FIG. 10C, the upper projections 2c, 2e at the front and rear end portions of the blank tube are formed with bores 2a, 2b, respectively, and the front and rear end portions of the blank tube are formed with cutouts 2g, 2h for removing portions of the material which are unnecessary in the down tube 2. The rear end portion of the down tube 2 so prepared has a longitudinal-section as shown in FIG. 11.

The bicycle frame according to the embodiment explained with reference to FIGS. 7 to 11 achieves all the advantages of the previous embodiment discussed above. Moreover, formation of the bores 2a, 2b at the bulge-processed front and rear end portions of the down tube 2 is also advantageous in that it serves to significantly facilitate the assembly of the tube members for manufacturing a bicycle frame, since the down tube 2 can be readily engaged with the head tube 6 and the seat tube 4 at the bores 2a, 2b, respectively, after all other tube members have been successively positioned one by one and welded to each other, as shown by imaginary line in FIG. 8.

Figure 12:
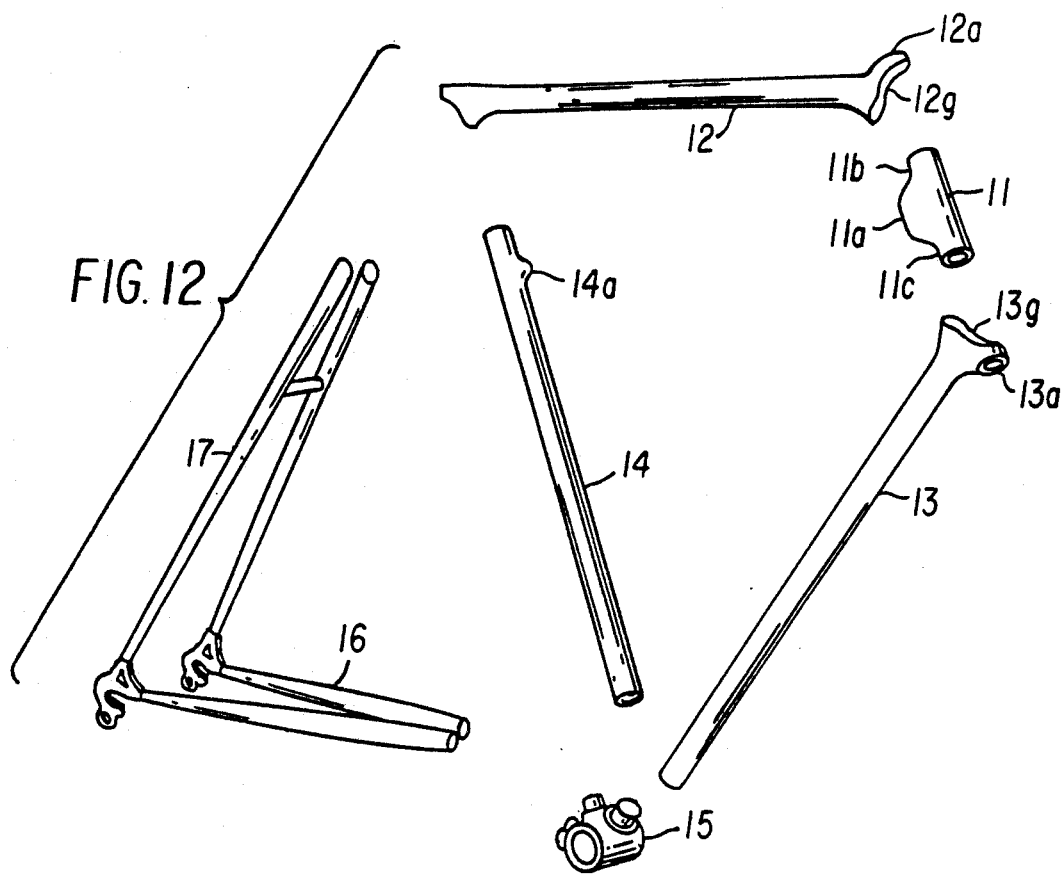
FIG. 12 is an exploded perspective view of the bicycle frame according to still another embodiment of the present invention.
Figure 13:
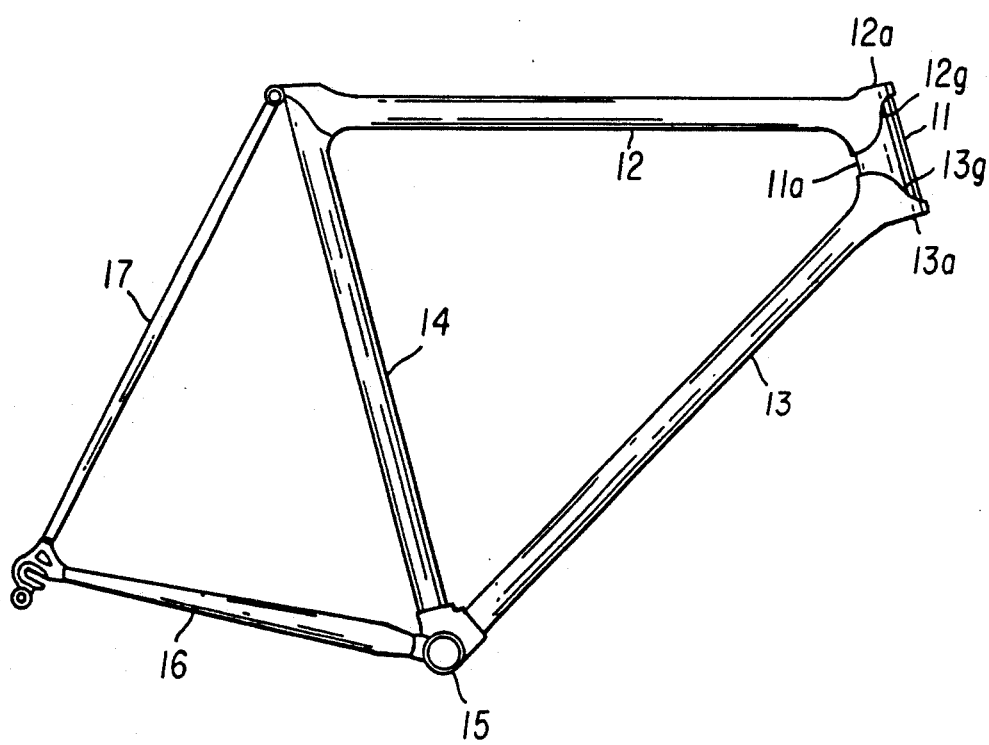
FIG. 13 is a side view of the bicycle frame shown in FIG. 12.
Figure 14:
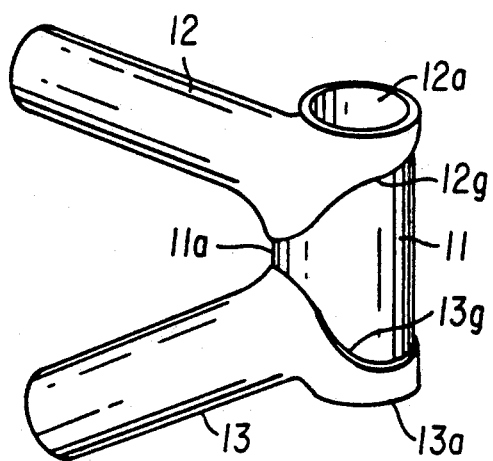
FIG. 14 is perspective view showing the head region in the bicycle frame of FIG. 12.
Figure 15:
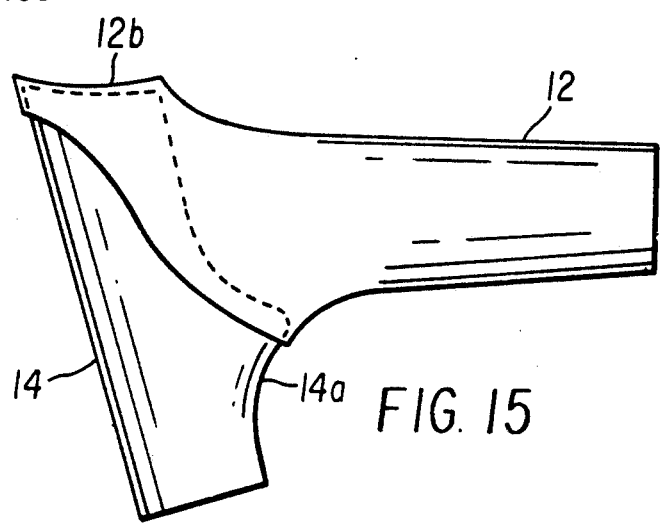
FIG. 15 is a side view showing the junction between the top tube and the seat tube in the bicycle frame of FIG. 12.

Still another embodiment of the bicycle frame according to the present invention will be explained below with reference to FIGS. 12 to 15, which is particularly featured by an aerodynamic configuration with streamlined cross-section of major tube members forming the head region of the bicycle frame. The frame includes a head tube 11, a top tube 12, a down tube 13, a seat tube 14, a hanger lug 15, a pair of chain stays 16 and a pair of seat stays 17, which can be fixedly secured to each other by brazing, welding or adhesion. This embodiment is substantially similar to the previous embodiments in its structure, and differs therefrom basically in the configuration of the head tube 11 and the seat tube 14, as shown in FIG. 12.

More particularly, the head tube 11 is combined with a top tube 12 having a bulge-processed front end portion which is formed with a bore 12a and a cutout 12g, like the top tube 1 in the previous embodiments. The head tube 11 has a bulge-processed intermediate portion 11a between the upper end portion 11b and the lower end portion 11c, which is bulged to protrude rearwardly of the bicycle frame, as appreciated from FIGS. 14, 16A and 16B. Thus, the upper end portion 11b and the lower end portion 11c of the head tube 11 has a circular cross-section, while the intermediate portion 11a has an oval, substantially egg-like cross-section.

The outer surface at the intermediate portion 11a of the head tube 11 is continuously adjoined with that of the top tube 12 at its front end portion. Furthermore, as particularly shown in FIG. 15, the seat tube 14 has a bulge-processed upper end portion 14a which is bulged to protrude forwardly of the bicycle frame. The outer surface at the upper end portion 14a of the seat tube 14 is continuously adjoined with that of the top tube 12 at its rear front end portion.

Figure 17:
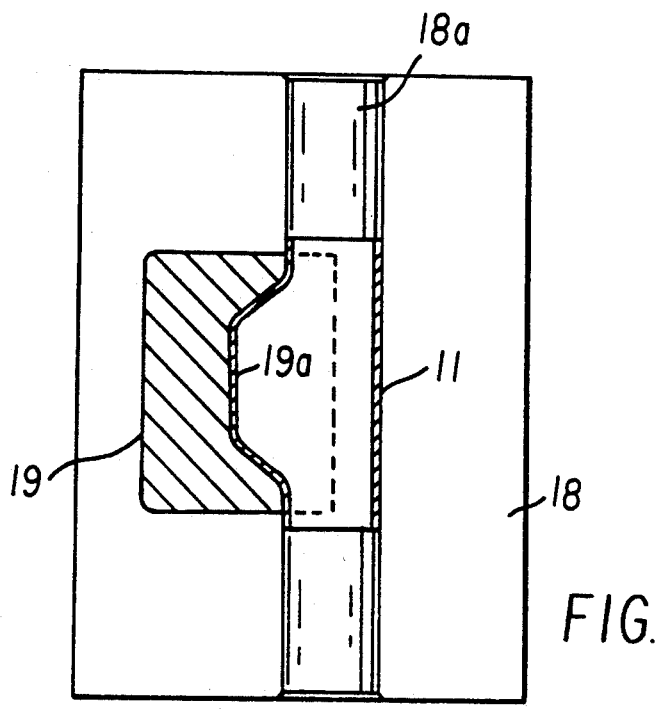
FIG. 17 is a plan view of the die assembly used to prepare the head tube shown in FIGS. 16A and 16B.

In order to form the heat tube 11 by subjecting a blank tube material to a bulge-process, a multi-piece die assembly 18 is used which may be one as shown in FIG. 17. The die assembly includes upper and lower dies each having a parting surface which is formed with a recess 18a of semi-circular cross section for accommodating the a blank tube therein. The upper and lower dies are each combined with an exchangeable stopper 19 detachably fitted therein, which is formed with a recess 19a having a surface corresponding to the bulge-processed intermediate portion 11a of the head tube 11.

Figure 16A:
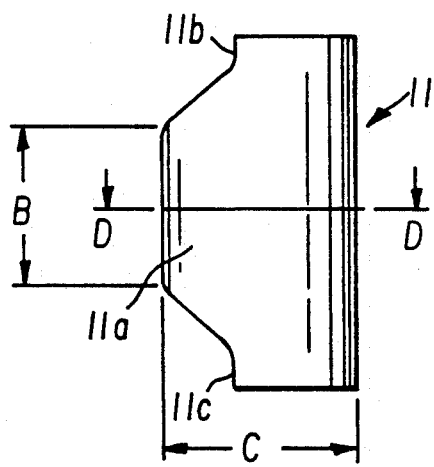
FIG. 16A is a side view of the head tube in the bicycle frame of FIG. 12.
Figure 16B:
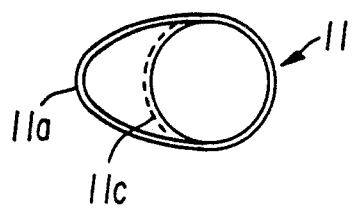
FIG. 16B is a cross-sectional view taken along the line D—D in FIG. 16A.

Referring to FIGS. 16A and 16B, for manufacturing a plurality of kinds of bicycle frames which are different from each other in specification, e.g. in frame size, it is necessary to prepare a plurality of kinds of head tubes 11 having the intermediate portion 11a of different axial length B and/or width C as measured in the fore-and-aft direction of the bicycle frame. This can be readily accomplished by exchanging the stopper 19, without requiring exchange of remaining components of the die assembly 18.

Figure 18A:
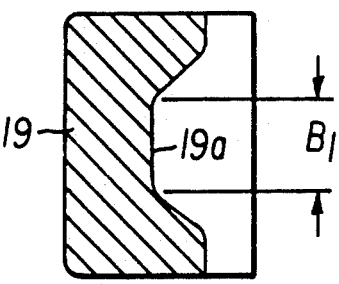
FIGS. 18A, 18B and 18C are plan views showing different examples of the stopper to be used in the die assembly of FIG. 17.
Figure 18B:
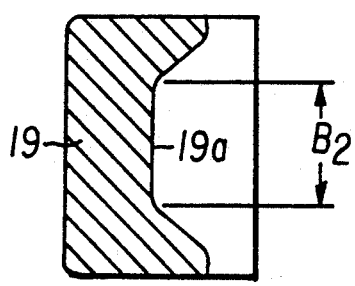
Figure 18C:
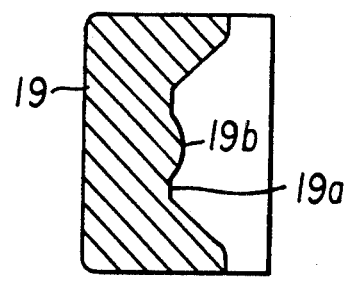

FIGS. 18A and 18B illustrate different stoppers 19 for preparing a head tube 11 of an axial length $B_1$, and another head tube 11 of a smaller axial length $B_2$, respectively. Depending upon various design requirements, as shown in FIG. 18C, the stopper 19 may have a projection along the surface of the recess 19a. Similarly, there are shown in FIGS. 19A and 19B different stoppers 19 for preparing a head tube 11 of a width $C_1$, and another head tube 11 of a larger width $C_2$, respectively.

The top tube 12 of the bicycle frame according to the embodiment of FIGS. 12 to 15 can be prepared substantially in the same manner as discussed with reference to FIGS. 4A to 4D. In this connection, corresponding to various specifications of the bicycle frame to be manufactured, the front end portion of the top tube 12 shown in FIG. 20A may be formed with selected one of different cutouts $12g_1$, $12g_2$, $12g_3$, to remove different amount of material as particularly illustrated in FIG. 20B.

Figure 21A:
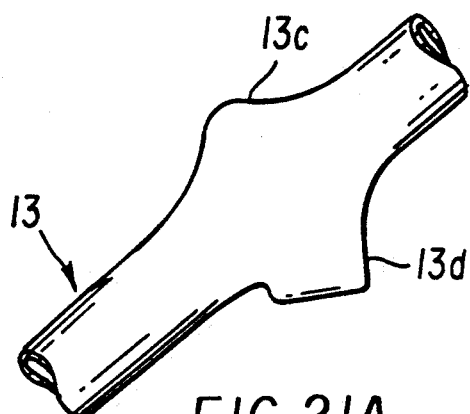
FIGS. 21A is a side view showing the bulge-process performed with respect to the front end portion of the down tube.
Figure 21B:
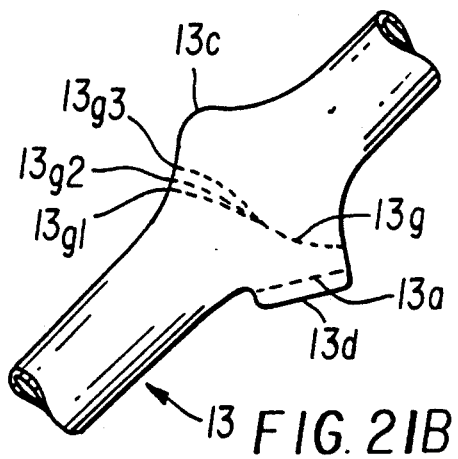
FIG. 21B is a side view showing the cutout formation process performed with respect to the front end portion of the down tube.

Similarly, the down tube 13 of the bicycle frame according to the embodiment of FIGS. 12 to 15 can be prepared substantially in the same manner as discussed with reference to FIGS. 10A to 10C. In this connection, corresponding to various specifications of the bicycle frame to be manufactured, the front end portion of the down tube 13 shown in FIG. 21A may be formed with selected one of different cutouts $13g_1$, $13g_2$, $13g_3$, to remove different amount of material as particularly shown in FIG. 21B.

There are shown in FIGS. 22 to 25 various examples of the head region of the bicycle frame according to the embodiment of FIGS. 12 to 15.

Figure 22:
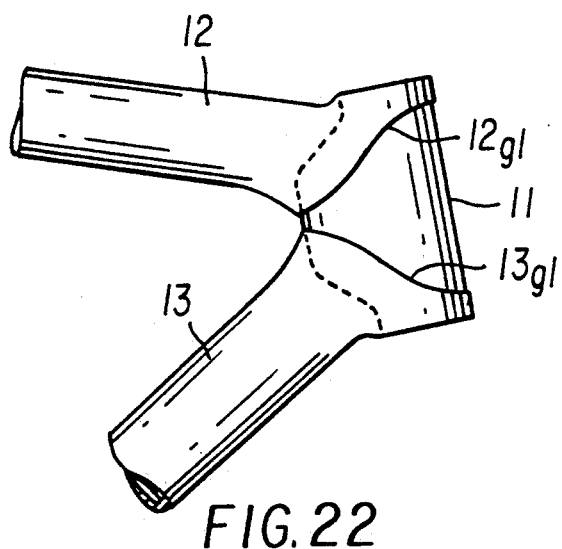
FIGS. 22 to 25 are side views showing different examples of the hear region in the bicycle frame of FIG. 12.

A first example is shown in FIG. 22, wherein a head tube 11 of a relatively small axial length B and relatively large width C is combined with a top tube 12 having a cutout $12g_1$ and also with a down tube 13 having a cutout $13g_1$.

Figure 23:
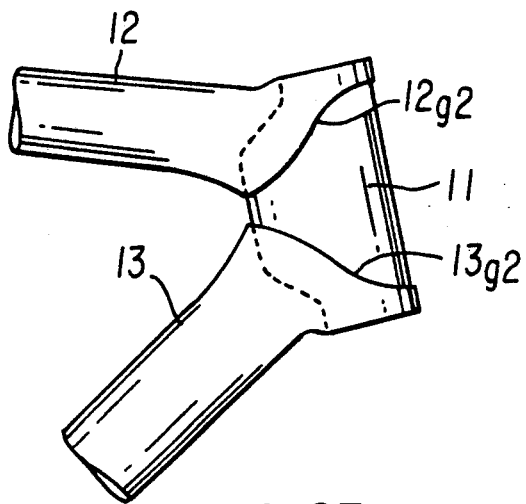

A second example is shown in FIG. 23, wherein a head tube 11 of a relatively large axial length B and relatively large width C is combined with a top tube 12 having a cutout $12g_2$ and also with a down tube 13 having a cutout $13g_2$.

Figure 24:
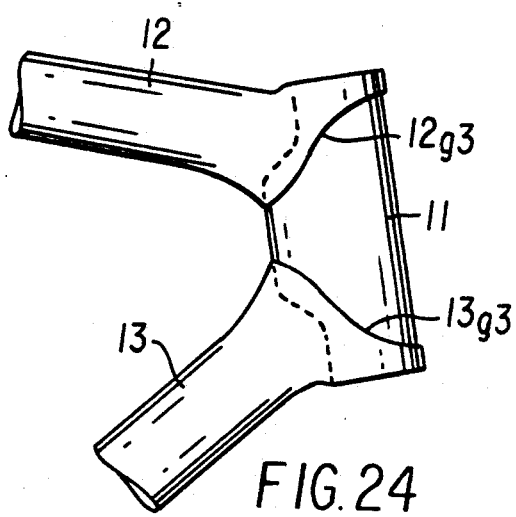

A third example is shown in FIG. 24, wherein a head tube 11 of a relatively large axial length B and a relatively small width C is combined with a top tube 12 having a cutout $12g_3$ and also with a down tube 13 having a cutout $13g_3$.

Figure 25:
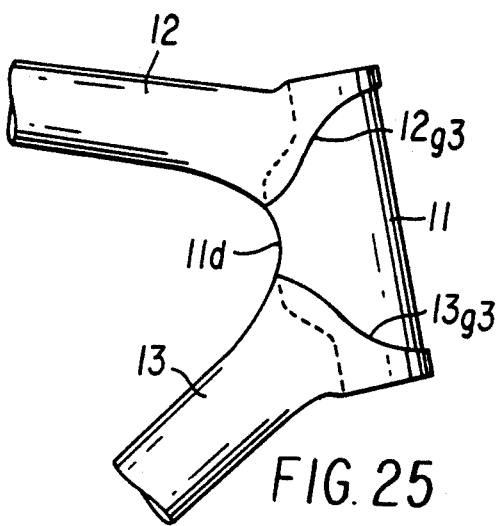

A fourth example is shown in FIG. 25, wherein a head tube 11 having a recess 11d is prepared by using a die assembly including the stopper shown in FIG. 18c, and is combined with a top tube 12 having a cutout $12g_3$ and also with a down tube 13 having a cutout $13g_3$.

It will be appreciated that the embodiment explained above with reference to FIGS. 12 to 15 is particularly advantageous in that a variety of aerodynamic configurations of the head region can be readily realized with a markedly improved manufacturing productivity. Because the head region is formed by combining a head tube, a top tube and a down tube which have been pre-subjected to bulge process, not only high rigidity and mechanical strength can be readily achieved despite a hollow and hence light structure, but also it is readily possible to realize a continuous curvature at the junction between the tube members forming the head region of the bicycle frame. Similarly, formation of the junction between the top tube and the seat tube by the end portions which have been pre-subjected to bulge process serves to significantly improve the rigidity and mechanical strength and to reduce the weight, and also to realize a continuous curvature at the junction between the relevant tube members.

For preparing various tube members which are provided with bulge-processed end portions but different from each other in length or intersection angle relative to adjacent tube member to realize bicycle frames of different specifications, it has been a conventional practice to exchange the entire die assembly of a unitary structure so that a plurality of die assemblies have to be prepared and stored. The necessity for the preparation and storage of a plurality of die assembly results in increased production cost and complexity in terms of production control.

Figure 26A:
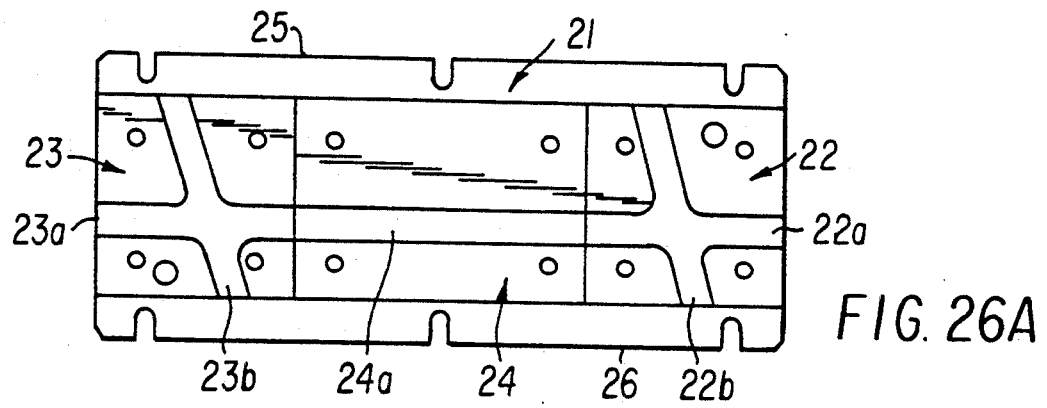
FIGS. 26A, 26B and 26C are respectively plan view, front view and side view of the die assembly according to the present invention which can be used to form tube members having bulge-processed end portions.

The present invention provides novel method and apparatus for eliminating or at least mitigating the above-mentioned drawbacks. Thus, according to another aspect of the invention, as particularly shown in FIGS. 26A to 26C, the die assembly 21 is composed of three exchangeable dies including a first die 22 for forming a bulge-processed end portion of the tube member, a second die 23 for forming another bulge-processed end portion of the tube member, and a third die 24 for forming a straight intermediate portion of the tube member which is not subjected to a bulge-process. The dies 22, 23, 24 are each composed of upper and lower halves 22A, 22B; 23A, 23B; 24A, 24B which are each formed in the parting surfaces with a straight recesses 22a, 23a, 24a of a semi-circular cross-section. The upper and lower halves 22A, 22B; 23A, 23B for the dies 22, 23 corresponding to the bulge-processed end portion of the tube member are each formed in the parting surface with another recess 22b, 23b of a semi-circular cross-section, which intersects at a predetermined angle with the straight recess 22a, 23a. The upper surface of the upper halves 22A, 23A, 24A and the lower surface of the lower halves 22B, 23B, 24B are respectively associated with an upper die plate 25 and a lower die plate 26. The die assembly 31 is further associated with hydraulic cylinder devices 26 including pistons 27 for applying fluid pressure into the inner space of the blank tube placed in the cavity of the die assembly, thereby to carry out the bulge-process.

Figure 27A:
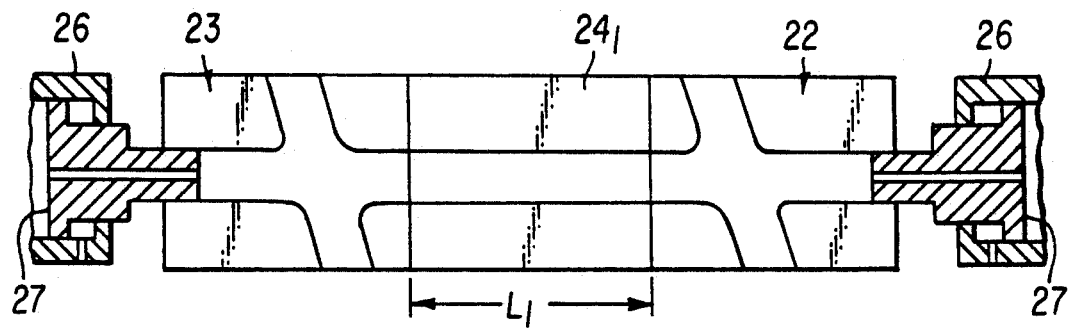
FIGS. 27A, 27B and 27C are respectively plan views of the die for the intermediate portion the tube member, showing the manner of formation of tube members with different axial length of the intermediate portion.
Figure 27B:
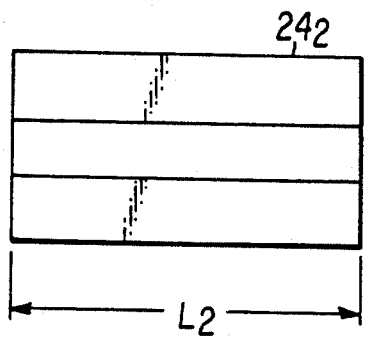
Figure 27C:
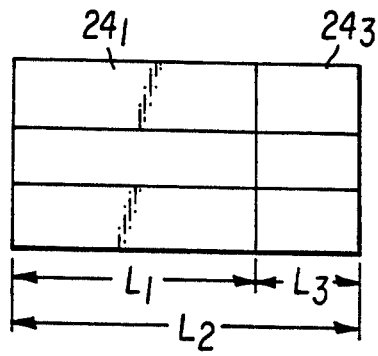

To form various tube members with intermediate portions which are different in axial length, as shown in FIGS. 27A to 27C, the die $24_1$ for forming the intermediate portion of the length $L_1$ may be exchanged with another die $24_2$ having a different, desired length $L_2$, or may be combined with another die $24_3$ having a length $L_3$ which is so selected that the sum of the length $L_1$ and the length $L_3$ equals to the desired length $L_2$.

Figure 26B:
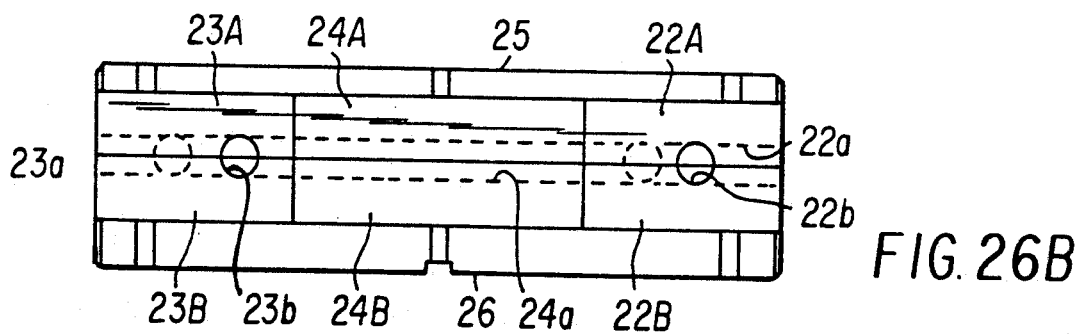
Figure 26C:
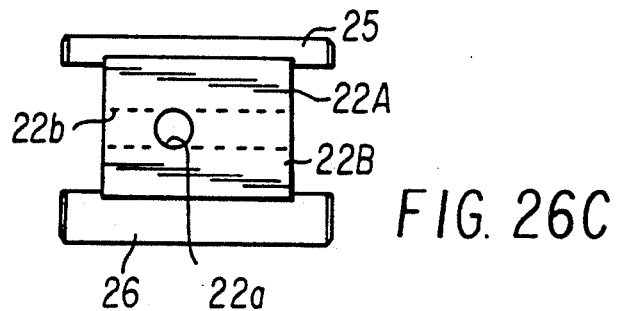
Figure 28A:
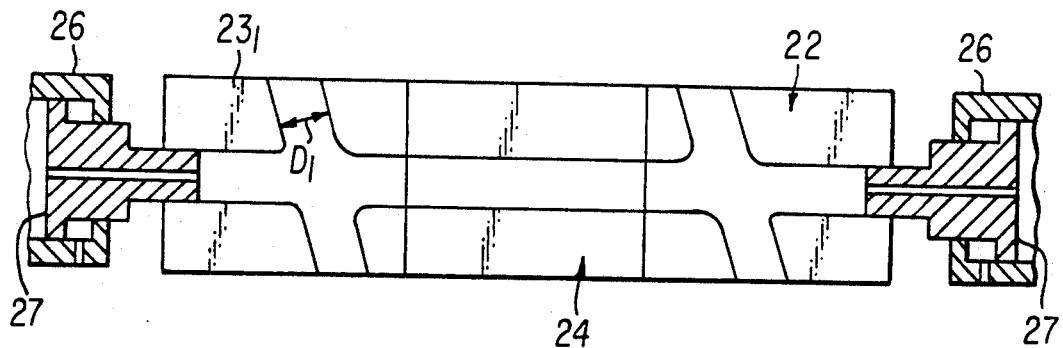
FIGS 28A and 28B are respectively plan views of the dies for the end portion the tube member, showing the manner of formation of tube members with different diameter of the end portion.
Figure 28B:
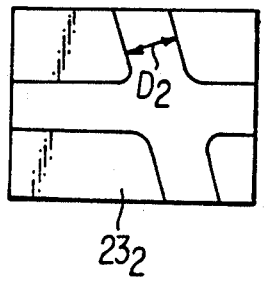

To form various tube members with end portions which are different in diameter, as shown in FIGS. 28A and 26B, the die $23_1$ corresponding to the diameter $D_1$ may be exchanged with another die $13_2$ corresponding to a different, desired diameter $D_2$.

Figure 29A:
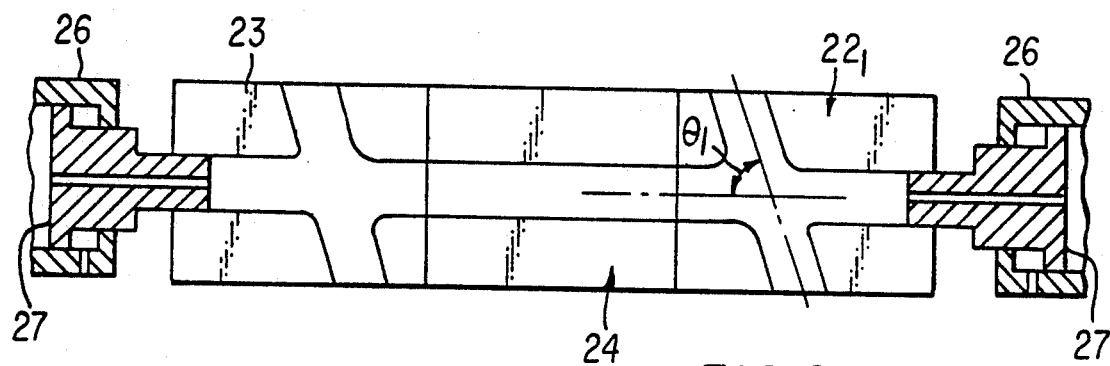
FIGS. 29A and 29B are respectively plan views of the dies for the end portion the tube member, showing the manner of formation of tube members with different intersection angle of the end portion.
Figure 29B:
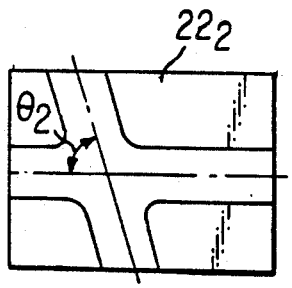

Furthermore, to form various tube members with end portions which are different in intersection angle, as shown in FIGS. 29A and 29B, the die $22_1$ corresponding to the angle $\theta_1$ may be exchanged with another die $23_2$ corresponding to a different, desired angle $\theta_2$.

In this manner, a variety of tube members can be manufactured by preparing respective groups of the first, second and third dies, selecting each one die from the respective groups corresponding to a desired specification of the tube member to be formed, and detachably connecting the selected dies with each other to form a die assembly, without requiring preparation and storage of a plurality of die assembly of a unitary structure. This serves to significantly reduce the production cost and simplify the production control.

It will be appreciated from the foregoing detailed description that the present invention provides an improved bicycle frame having sufficient rigidity and mechanical strength, a high accuracy, and a minimized weight, which can be readily manufactured by an automated process, and further provides novel method and apparatus for manufacturing bicycle frames, which is capable of significantly improving the productivity and which is suitable for manufacturing bicycle frames of various specifications, e.g. frame size, with a high accuracy and at a reduced cost.

While the present invention has been explained with reference to some specific embodiments, they were given by way of examples only and it is apparent that various alterations and/or modifications may be made without departing from the scope of the invention.

We claim:

1. A bicycle frame comprising:
   a head tube having upper and lower end portions;
   top and down tubes having respective front and rear end portions, the upper and lower end portions of the head tube being integrally connected to the front end portions of the top and down tubes, respectively;
   a seat tube having upper and lower end portions;
   first and second seat stays each having front and rear end portions, the front end portions of the first and second seat stays being integrally connected to the rear end portion of the top tube;
   first and second chain stays each having front and rear end portions, the first seat stay and the first chain stay having respective rear end portions integrally connected to each other thereby forming a first pair, the second seat stay and the second chain stay having respective rear end portions integrally connected to each other thereby forming a second pair; and
   a hanger lug integrally connected to the rear end portion of the down tube, the lower end portion of the seat tube and the front end portions of the first and second chain stays;
   wherein front and rear end portions of the top tube comprise respective front and rear bulge-processed ends which form respective front and rear bores to receive the upper end portion of the head tube and the upper end portion of the seat tube, respectively, each bulge-processed end comprising a ring-shaped portion which completely circumferentially surrounds the head tube and the seat tube at respective upper end portions thereof, each bore having an axis which intersects the longitudinal axis of the top tube;
   wherein the front end portion of the down tube comprises a front bulge-processed end which forms a bore to receive the lower end portion of the head tube, the bore comprising a ring-shaped portion which completely circumferentially surrounds the head tube at the lower end portion thereof, the bore having an axis which intersects the longitudinal axis of the down tube; and
   wherein a vertical dimension of the top tube as viewed in cross-section increases from an intermediate portion thereof to the front and rear end portions thereof, and wherein a vertical dimension of the down tube as viewed in cross-section increases from an intermediate portion thereof to the front end portion thereof.

2. The bicycle frame of claim 1, wherein the hanger lug comprises:
   first and second bulge-processed projections fitted within and fixedly secured to the front end portions of the first and second chain stays, respectively;
   a third bulge-processed projection fitted within and fixedly secured to the rear end portion of the down tube; and
   a fourth bulge-processed projection fitted within and fixedly secured to the lower end portion of the seat tube.

3. The bicycle frame of claim 1, wherein the rear end portion of the down tube comprises a rear bulge-processed end defining a bore having an axis which intersects the longitudinal axis of the down tube, the bore accommodating therein the lower end portions of the seat tube.

4. The bicycle frame of claim 3, wherein the hanger lug comprises first and second bulge-processed projections fitted within and fixedly secured to the front end portions of the first and second chain stays, respectively, and wherein said hanger lug is fixedly secured to the rear bulge-processed end of the down tube.

5. The bicycle frame of claim 3, wherein the vertical dimension of the down tube gradually increases from the intermediate portion thereof toward the rear end portion thereof.

6. The bicycle frame of claim 5, wherein the intermediate portion of the down tube has a substantially circular cross-section, and each of the front and rear end portions of the down tube has a substantially oval cross-section which is vertically elongate and asymmetrical.

7. The bicycle frame of claim 1, wherein:
   said head tube has an intermediate bulge-processed portion between the upper and lower end portions thereof, the intermediate bulge-processed portion protruding rearwardly from the head tube;

the front bulge-processed end of the top tube forms a lug having an inner contour which conforms with an outer contour of the head tube between the upper end portion and the intermediate bulge-processed portion of the head tube; and wherein the front bulge-processed end of the down tube forms a lug having an inner contour which conforms with an outer contour of the head tube between the lower end portion and the intermediate bulge-processed portion of the head tube.

8. The bicycle frame of claim 1, wherein:

the upper end portion of the seat tube comprises an upper bulge-processed end protruding forwardly from the seat tube; and the rear bulge-processed end of the top tube forms a lug having an inner contour which conforms with an outer contour of the upper bulge-processed end of the seat tube.

9. The bicycle frame of claim 1, wherein the intermediate portion of the top tube has a substantially circular cross-section, and each of the front and rear end portions of the top tube has a substantially oval cross-section which is vertically elongate and asymmetrical.

10. The bicycle frame of claim 1, wherein the intermediate portion of the down tube has a substantially circular cross-section, and the front end portion of the down tube has a substantially oval cross-section which is vertically elongate and asymmetrical.

* * * * *